(12) United States Patent
Chien et al.

(10) Patent No.: US 10,277,798 B2
(45) Date of Patent: Apr. 30, 2019

(54) MULTIPLE LENSES SYSTEM, OPERATION METHOD AND ELECTRONIC DEVICE EMPLOYING THE SAME

(71) Applicant: Chiun Mai Communication Systems, Inc., New Taipei (TW)

(72) Inventors: How-Wen Chien, New Taipei (TW); Chien-Hsun Ho, New Taipei (TW); Shih-Han Chen, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 15/403,190

(22) Filed: Jan. 11, 2017

(65) Prior Publication Data
US 2017/0208239 A1 Jul. 20, 2017

(30) Foreign Application Priority Data
Jan. 20, 2016 (CN) .......................... 2016 1 0034904

(51) Int. Cl.
*H04N 5/232* (2006.01)
*G03B 13/00* (2006.01)
(Continued)

(52) U.S. Cl.
CPC ....... *H04N 5/23212* (2013.01); *H04N 5/2253* (2013.01); *H04N 5/2254* (2013.01);
(Continued)

(58) Field of Classification Search
CPC .... H04N 5/2259; H04N 5/23209; G03B 5/00; G03B 13/20; G03B 17/14; G03B 17/12;
(Continued)

(56) References Cited

U.S. PATENT DOCUMENTS 7,453,510 B2 * 11/2008 Kolehmainen .... G02B 13/0015
348/262
7,676,146 B2    3/2010 Border et al.
(Continued)

FOREIGN PATENT DOCUMENTS

CN    101632296 A    1/2010
CN    102879976 A    1/2013
(Continued)

*Primary Examiner* — Kelly L Jerabek
(74) *Attorney, Agent, or Firm* — ScienBiziP, P.C.

(57) ABSTRACT

A multiple lenses system applied in an electronic device is provided. The multiple lenses system includes a camera module, a focus module, an image sensor and a processor. The camera module includes at least one macro lens, at least one functional lens and a focus distance threshold. The focus module focuses on an object to be captured and obtains a focus distance. The image sensor captures images cooperatively with the camera module. The processor compares the focus distance and the focus distance threshold. If the processor determines the focus distance crosses the focus distance threshold, then the processor triggers the camera module to switch between the at least one macro lens and the at least one functional lens for capturing images. An electronic device employing the multiple lenses system and an operation method thereof are also provided.

22 Claims, 2 Drawing Sheets

(51) Int. Cl.
*H04N 5/225* (2006.01)
*G02B 7/38* (2006.01)
*G02B 7/36* (2006.01)

(52) U.S. Cl.
CPC ....... *H04N 5/2258* (2013.01); *H04N 5/23245* (2013.01); *H04N 5/23293* (2013.01); *G02B 7/36* (2013.01); *G02B 7/38* (2013.01)

(58) Field of Classification Search
CPC . G02B 7/09; G02B 7/105; G02B 7/28; G02B 7/32; G02B 7/14
See application file for complete search history.

(56) References Cited

U.S. PATENT DOCUMENTS

| | | | | |
|---|---|---|---|---|
| 7,859,588 | B2* | 12/2010 | Parulski | H04N 5/2258 |
| | | | | 348/349 |
| 9,118,907 | B2* | 8/2015 | Yamagata | H04N 13/0239 |
| 9,185,291 | B1 | 11/2015 | Shabtay et al. | |
| 9,538,152 | B2 | 1/2017 | Shabtay et al. | |
| 2003/0020814 | A1* | 1/2003 | Ono | H04N 5/225 |
| | | | | 348/220.1 |
| 2006/0139475 | A1 | 6/2006 | Esch et al. | |
| 2008/0219654 | A1 | 9/2008 | Border et al. | |
| 2013/0120641 | A1* | 5/2013 | Nagaoka | H04N 5/23212 |
| | | | | 348/345 |
| 2014/0355131 | A1* | 12/2014 | Kulas | G02B 15/22 |
| | | | | 359/693 |
| 2015/0350522 | A1* | 12/2015 | Lindskog | H04N 5/23212 |
| | | | | 348/349 |
| 2016/0007008 | A1 | 1/2016 | Molgaard et al. | |
| 2016/0050374 | A1 | 2/2016 | Shabtay et al. | |
| 2016/0094779 | A1* | 3/2016 | Arakawa | H04N 5/23212 |
| | | | | 348/348 |
| 2016/0100106 | A1 | 4/2016 | Shi et al. | |
| 2016/0134793 | A1* | 5/2016 | Samanta | H04N 5/23216 |
| | | | | 348/222.1 |
| 2017/0013179 | A1 | 1/2017 | Kang et al. | |
| 2017/0094164 | A1 | 3/2017 | Shabtay et al. | |

FOREIGN PATENT DOCUMENTS

| | | |
|---|---|---|
| CN | 103257429 A | 8/2013 |
| CN | 103488039 A | 1/2014 |
| CN | 103841324 A | 6/2014 |
| CN | 104182173 A | 12/2014 |
| CN | 104363379 A | 2/2015 |
| TW | 201351976 A | 12/2013 |
| TW | 201526645 A | 7/2015 |
| TW | 201530214 A | 8/2015 |

* cited by examiner

MULTIPLE LENSES SYSTEM, OPERATION METHOD AND ELECTRONIC DEVICE EMPLOYING THE SAME

FIELD

The subject matter herein generally relates to a multiple lenses system automatically switching lenses and an electronic device employing the multiple lenses system.

BACKGROUND

Electronic devices normally include a camera module for daily photographing. Traditional camera module has only one lens, however, when focusing on macro distances objects, it needs a period of time for switching and may easily go fuzzy, which makes the photographing worse than expected.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
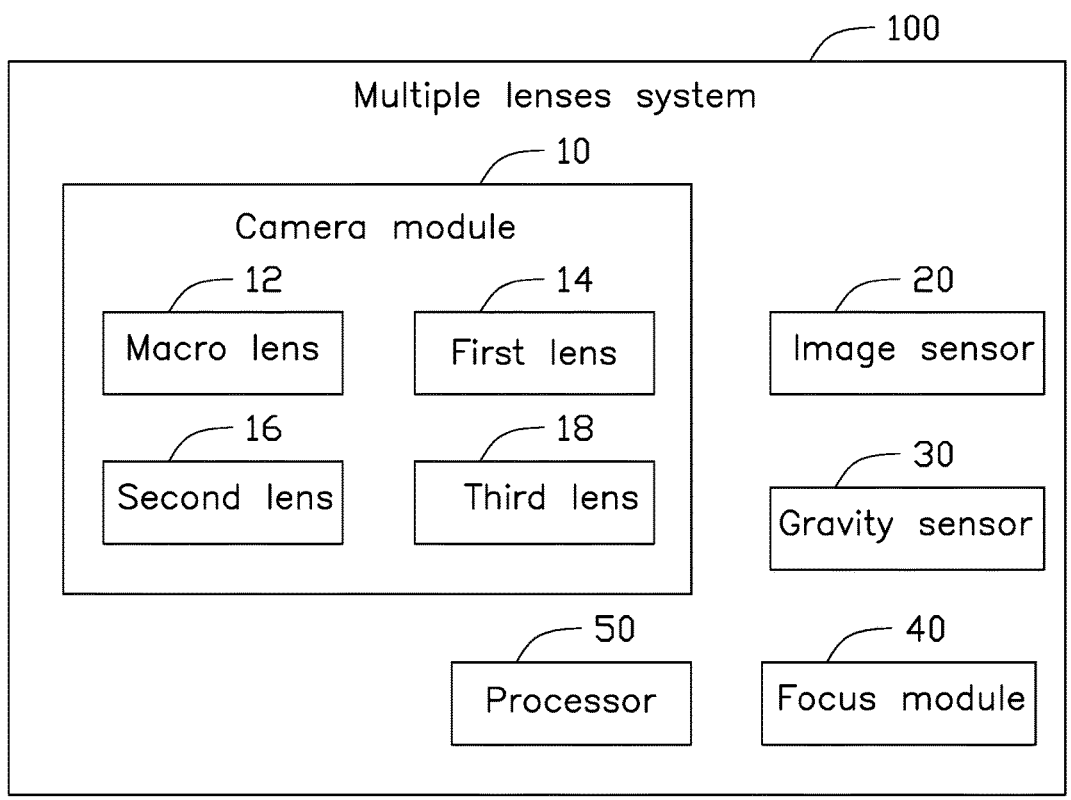
FIG. 1 is a block diagram of an exemplary embodiment of a multiple lenses system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a multiple lenses system 100 applied in an electronic device. The electronic device can be a mobile phone, a tablet computer and a personal digital assistant (PDA), which has a screen displaying user interface. The multiple lenses system 100 includes a camera module 10, an image sensor 20, a gravity sensor 30, a focus module 40, and a processor 50.

The camera module 10 includes four lenses of different types. In at least one embodiment, the camera module 10 includes at least one macro lens 12 configured to capture images for objects in macro distances. In addition, the camera module 10 further includes three functional lenses, which are a first lens 14, a second lens 16 and a third lens 18. Different lenses or different groups of lenses can achieve different capturing effects. For instance, to capture objects in macro distances, the macro lens 12 is selected; when every two of the first lens 14, the second lens 16 and the third lens 18 are selected, to capture under modes of 3D image, high dynamic range (HDR), low light image quality and high resolution. The camera module 10 includes a focus distance threshold. When a distance between the object and the camera module 10 is smaller than the focus distance threshold, only the macro lens 12 of the camera module 10 can focus on the object clearly.

In other embodiments, the camera module 10 may include more or less lenses in different types. The camera module 10 can also include one or more functional lens.

The image sensor 20 is configured to capture images cooperatively with the camera module 10.

The gravity sensor 30 is configured to detect an orientation angle of the electronic device to adjust a display direction of the screen, and further to switch lenses of the camera module 10 for capturing images. The orientation angle is a degree between a vertical axis of the electronic device and a gravity direction. For instance, when the electronic device is placed in horizontal direction, the orientation angle of the electronic device is 90 degree; when the electronic device is placed in vertical direction, the orientation angle of the electronic device is 0 degree.

The focus module 40 is configured to focus on the object to be captured and obtain a focus distance between the object and the focus module 40. In at least one embodiment, the focus module 40 may obtain the focus distance by at least one of the three follow ways. The first way is laser ranging. The second way is estimating the focus distance by obtaining a sharpness of the object's edge in an image captured by the image sensor 20. The third way is capturing images respectively by two of the lenses of the camera module 10 and obtaining a depth of field, and then estimating the focus distance based on the depth of field.

The processor 50 sets a plurality of capturing modes, for instance, a 3D mode, a HDR mode, a low light image quality mode and a high resolution mode. In at least one embodiment, the processor 50 is configured to select one of the capturing modes and determine the switching to one of the lenses or one group of the lenses according to the capturing modes, the detected focus distance and the orientation angle.

When a group of the lenses is selected for image capturing, due to positions differences of the lenses, the processor 50 needs to cut off redundant parts of the images captured by the group of the lenses and reserve the overlapped part of the images, thus to present a consistent image.

Figure 2:
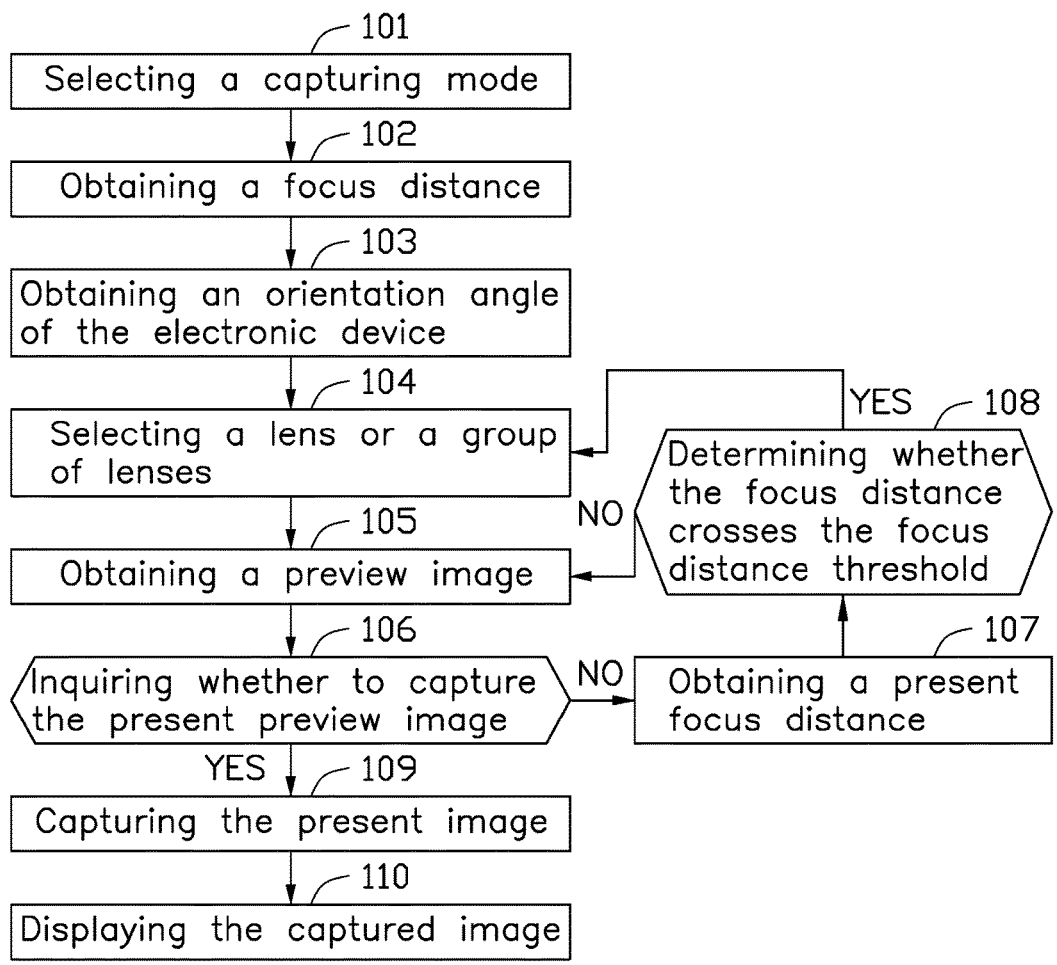
FIG. 2 is a flow chat of an exemplary embodiment of an operation method of the multiple lenses system.

FIG. 2 illustrates an operation method of the multiple lenses system 100. The multiple lenses system 100 includes following blocks:

In block S101, the processor 50 selects a capturing mode. The 3D mode, the HDR mode, the low light image quality mode and the high resolution mode can be selected as a present capturing mode.

In block S102, the focus module 40 obtains a focus distance and transmits to the processor 50.

In block S103, the gravity sensor 30 obtains an orientation angle of the electronic device and transmits the orientation angle to the processor 50.

In block S104, the processor 50 selects a lens or a group of lenses according to the present capturing mode, the detected focus distance and the orientation angle. When the focus distance is smaller than the focus distance threshold, the processor 50 selects the macro lens 12 for macro distance capturing. When the focus distance is larger than the focus distance threshold, the processor 50 selects a lens or a group of lenses according to the present capturing mode and the orientation angle of the electronic device. For instance, when the electronic device is in a vertical state, the processor 50 selects the first lens 14 and the third lens 18 as the group of lenses; when the electronic device is in a horizontal state, the processor 50 selects the second lens 16 and the third lens 18 as the group of lenses. The first lens 14, the second lens 16 and the third lens 18 are three different functional types of lenses. The processor 50 may select a lens or a group of lenses according to the present capturing mode.

In block S105, the image sensor 20 obtains a preview image. The preview image is displayed on the screen of the electronic device and present to the user. In other embodiments, the electronic device may further transmit the preview image to other electronic devices for being displayed by Bluetooth or Wi-Fi technology.

In block S106, the electronic device inquires whether to capture the present preview image via the user interface. User may determine whether to capture the image via an option menu displayed in the user interface. If no operation is input to the user interface, then the electronic device does not capture the image and then goes to block S107; if the user chooses to capture the image and operates via the user interface, the electronic device receives a capturing command from the user and then goes to block S109.

In block S107, the focus module obtains a present focus distance.

In block S108, the processor 50 determines whether the focus distance crosses the focus distance threshold. If the focus distance crosses the focus distance threshold, then goes back to block S104. If the focus distance does not cross the focus distance threshold, then goes back to block S105. Crossing the focus distance threshold means when the present focus distance is smaller than the focus distance threshold and the previous focus distance is greater than the focus distance threshold, or the present focus distance is greater than the focus distance threshold and the previous focus distance is smaller than the focus distance threshold. For instance, if a single lens or a group of lenses is selected from the first lens 14, the second lens 16 and the third lens 18 for capturing, and when the focus distance crosses the focus distance threshold, then goes back to block S104 to switch to the macro lens 12 for capturing. Vice versa, if the macro lens 12 is selected for capturing, and when the focus distance crosses the focus distance threshold, then the flow goes back to block S104 to switch to select a single lens or a group of lenses from the first lens 14, the second lens 16 and the third lens 18 for capturing.

In block S109, the image sensor 20 captures the present image cooperatively with the camera module 10 according to the capturing mode and the orientation angle of the electronic device.

In block S110, the electronic device displays the captured image. The electronic device displays the captured image by the screen, or transmits the captured image to other electronic devices by Bluetooth or Wi-Fi technology.

The multiple lenses system 100 includes a camera module 10 having a plurality of lenses, thus the electronic device may capture images according to selected capturing mode, focus distance and orientation angle of the electronic device to select a lens or a group of lenses, which makes the capturing faster and more accurate.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A multiple lenses system applied in an electronic device, the multiple lenses system comprising:
   a camera module, the camera module comprising at least one first lens and at least one second lens, the camera module comprising a focus distance threshold;
   an image sensor, the image sensor configured to capture a preview image cooperatively with the at least one first lens or the at least one second lens;
   a focus module, the focus module configured to estimate a focus distance by obtaining a sharpness of an object's edge in the preview image; and
   a processor, the processor configured to select a present capturing mode from a plurality of capturing modes, select the at least one first lens or the at least one second lens according to the present capturing mode and the focus distance to obtain the preview image cooperatively with the image sensor, and compare the focus distance and the focus distance threshold, wherein if the processor determines that the focus distance crosses the focus distance threshold, then the processor triggers the camera module to switch from the at least one first lens to the at least one second lens or switch from the at least one second lens to the at least one first lens to obtain the preview image.

2. The multiple lenses system as claimed in claim 1, further comprising a gravity sensor, wherein the gravity sensor is configured to detect an orientation angle of the electronic device.

3. The multiple lenses system as claimed in claim 2, wherein the camera module comprises a plurality of second lenses of different function types, different second lenses or different groups of second lenses achieve different capturing modes.

4. The multiple lenses system as claimed in claim 3, wherein the processor selects at least one of the at least one first lens and the plurality of second lenses according to the present capturing mode, the focus distance and the orientation angle of the electronic device for obtaining the preview image.

5. The multiple lenses system as claimed in claim 4, wherein the processor selects the at least one first lens for capturing the preview image when the focus distance is smaller than the focus distance threshold; the processor selects at least one of the second lenses for capturing the preview image according to the present capturing mode and the orientation angle of the electronic device when the focus distance is greater than the focus distance threshold.

6. The multiple lenses system as claimed in claim 1, wherein the plurality of capturing modes at least comprises a 3D mode, a high dynamic range (HDR) mode, a low light image quality mode and a high resolution mode.

7. The multiple lenses system as claimed in claim 1, wherein the processor triggers the camera module to switch to the at least one first lens for capturing the preview image when the processor determines that the focus distance is smaller than the focus distance threshold and a previous focus distance is greater than the focus distance threshold;

the processor triggers the camera module to switch to the at least one second lens for capturing the preview image when the processor determines that the focus distance is greater than the focus distance threshold and the previous focus distance is smaller than the focus distance threshold.

8. The multiple lenses system as claimed in claim 1, wherein in addition to estimating the focus distance by obtaining the sharpness of the object's edge in the preview image, the focus module obtains the focus distance by at least one of two follow ways: laser ranging; and capturing images respectively by two of the lenses of the camera module and obtaining a depth of field and then estimating the focus distance based on the depth of field.

9. The multiple lenses system as claimed in claim 1, wherein the present capturing mode is an HDR mode.

10. An electronic device comprising a multiple lenses system, the multiple lenses system comprising:
    a camera module, the camera module comprising at least one first lens and at least one second lens, the camera module comprising a focus distance threshold;
    an image sensor, the image sensor configured to capture a preview image cooperatively with the at least one first lens or the at least one second lens;
    a focus module, the focus module configured to estimate a focus distance by obtaining a sharpness of an object's edge in the preview image; and
    a processor, the processor configured to select a present capturing mode from a plurality of capturing modes, select the at least one first lens or the at least one second lens according to the present capturing mode and the focus distance to obtain the preview image cooperatively with the image sensor, and compare the focus distance and the focus distance threshold, wherein if the processor determines the focus distance crosses the focus distance threshold, then the processor triggers the camera module to switch from the at least one first lens to the at least one second lens or switch from the at least one second lens to the at least one first lens to obtain the preview image.

11. The electronic device as claimed in claim 10, further comprising a gravity sensor, wherein the gravity sensor is configured to detect an orientation angle of the electronic device.

12. The electronic device as claimed in claim 11, wherein the camera module comprises a plurality of second lenses of different function types, different second lenses or different groups of second lenses achieve different capturing modes.

13. The electronic device as claimed in claim 12, wherein the processor selects at least one of the at least one first lens and the plurality of second lenses according to the present capturing mode, the focus distance and the orientation angle of the electronic device for obtaining the preview image.

14. The electronic device as claimed in claim 13, wherein the processor selects the at least one first lens for capturing the preview image when the focus distance is smaller than the focus distance threshold; the processor selects at least one of the second lenses for capturing the preview image according to the present capturing mode and the orientation angle of the electronic device when the focus distance is greater than the focus distance threshold.

15. The electronic device as claimed in claim 10, wherein the plurality of capturing modes at least comprises a 3D mode, a high dynamic range (HDR) mode, a low light image quality mode and a high resolution mode.

16. The electronic device as claimed in claim 10, wherein the processor triggers the camera module to switch to the at least one first lens for capturing the preview image when the processor determines that the focus distance is smaller than the focus distance threshold and a previous focus distance is greater than the focus distance threshold; the processor triggers the camera module to switch to the at least one second lens for capturing the preview image when the processor determines that the focus distance is greater than the focus distance threshold and the previous focus distance is smaller than the focus distance threshold.

17. The electronic device as claimed in claim 10, wherein in addition to estimating the focus distance by obtaining the sharpness of the object's edge in the preview image, the focus module obtains the focus distance by at least one of two follow ways: laser ranging; and capturing images respectively by two of the lenses of the camera module and obtaining a depth of field and then estimating the focus distance based on the depth of field.

18. An operation method of a multiple lenses system applied in an electronic device, the operation method comprising:
    setting a focus distance threshold of a camera module, the camera module comprising at least one first lens and at least one second lens;
    selecting a present capturing mode from a plurality of capturing modes;
    capturing a preview image cooperatively with the at least one first lens or the at least one second lens;
    estimating a focus distance by obtaining a sharpness of an object's edge in the preview image;
    selecting the at least one first lens or the at least one second lens of the camera module to obtain the preview image according to the present capturing mode and the focus distance;
    determining whether the focus distance crosses the focus distance threshold; and
    switching from the at least one first lens to the at least one second lens or switching from the at least one second lens to the at least one first lens to obtain the preview image if the focus distance crosses the focus distance threshold.

19. The operation method as claimed in claim 18, further comprising:
    selecting the at least one first lens for obtaining the preview image if the focus distance is smaller than the focus distance threshold; and
    selecting the at least one second lens for obtaining the preview image if the focus distance is greater than the focus distance threshold.

20. The operation method as claimed in claim 18, further comprising:
    obtaining an orientation angle of the electronic device; and
    selecting the at least one first lens or the at least one second lens to obtain the preview image according to the present capturing mode, the focus distance and the orientation angle of the electronic device.

21. An operation method of a multiple lenses system applied in an electronic device, the operation method comprising:
    setting a focus distance threshold of a camera module, the camera module comprising at least one first lens and at least one second lens;
    setting a high dynamic range (HDR) mode as a present capturing mode;
    capturing a preview image cooperatively with the at least one first lens or the at least one second lens;
    estimating a focus distance by obtaining a sharpness of an object's edge in the preview image;

selecting the at least one first lens or the at least one second lens of the camera module to obtain the preview image according to the present capturing mode and the focus distance;

determining whether the focus distance crosses the focus distance threshold; and switching from the at least one first lens to the at least one second lens or switching from the at least one second lens to the at least one first lens to obtain the preview image if the focus distance crosses the focus distance threshold.

22. The operation method as claimed in claim 21, further comprising:

obtaining an orientation angle of the electronic device; and selecting the at least one first lens or the at least one second lens to obtain the preview image according to the present capturing mode, the focus distance and the orientation angle of the electronic device.

* * * * *